(12) United States Patent
Peng et al.

(10) Patent No.: US 12,608,053 B1
(45) Date of Patent: Apr. 21, 2026

(54) HINGE DEVICE

(71) Applicant: Sinher Technology Inc., New Taipei (TW)

(72) Inventors: Chih-Huang Peng, New Taipei (TW); Chun-Fu Lin, New Taipei (TW); Nan-Hai Lai, New Taipei (TW)

(73) Assignee: SINHER TECHNOLOGY INC., New Taipei City (TW)

( * ) Notice: Subject to any disclaimer, the term of this patent is extended or adjusted under 35 U.S.C. 154(b) by 26 days.

(21) Appl. No.: 18/963,999

(22) Filed: Nov. 29, 2024

(51) Int. Cl.
| *E05D 1/04* | (2006.01) |
| *F16C 11/04* | (2006.01) |
| *G06F 1/16* | (2006.01) |

(52) U.S. Cl.
CPC ............ *G06F 1/1681* (2013.01); *F16C 11/04* (2013.01)

(58) Field of Classification Search
CPC ...... G06F 1/168; G06F 1/1681; G06F 1/1616; G06F 1/547; E05Y 2900/602; E05Y 2900/606; E05Y 2800/205; E05Y 2800/20; E05Y 2800/242; H04M 1/022; H04M 1/0214; H04M 1/0216; H04M 1/0268; H04B 1/3833; E05D 3/12; E05D 3/122; E05D 3/14; E05D 3/16; E05D 3/06; E05D 11/06; E05D 1/00; E05D 1/02; E05D 1/04; E05D 7/00; F16C 11/04; F16C 11/12
See application file for complete search history.

(56) References Cited

U.S. PATENT DOCUMENTS

| | | | | |
|---|---|---|---|---|
| 9,366,064 | B1 * | 6/2016 | Chen | G06F 1/1681 |
| 9,404,298 | B1 * | 8/2016 | Chen | G06F 1/1681 |
| 9,518,414 | B1 * | 12/2016 | Chen | G06F 1/1681 |
| 10,036,188 | B1 * | 7/2018 | Yao | H05K 5/0226 |
| 11,408,214 | B1 * | 8/2022 | Hsu | H04M 1/022 |
| 11,680,601 | B1 * | 6/2023 | Yao | G06F 1/1681 |
| | | | | 16/233 |
| 2024/0241552 | A1 * | 7/2024 | Zhang | F16C 11/04 |
| 2024/0431053 | A1 * | 12/2024 | Xu | F16C 11/04 |

FOREIGN PATENT DOCUMENTS

| | | | | |
|---|---|---|---|---|
| CN | 113027899 A | * | 6/2021 | F16C 11/103 |
| TW | M508002 | | 9/2015 | |

* cited by examiner

*Primary Examiner* — Chuck Y Mah
(74) *Attorney, Agent, or Firm* — Muncy, Geissler, Olds & Lowe, P.C.

(57) ABSTRACT

A hinge device, including a base, an arc-shaped mounting member, and two torque components. The base is formed with a mounting space and two first tracks located on two opposite sides of the mounting space. The arc-shaped mounting member is provided with an arc-shaped portion positioned in the mounting space and moves along the two first tracks, and a mounting portion connects to the arc-shaped portion. The arc-shaped portion defines a first virtual axis, while the two opposing sides of the mounting portion are formed with two second tracks. Each of the two torque components includes a shaft located on one side of the base, a torque providing component mounted on the shaft, and a linkage rod. The linkage rod is provided with a second virtual axis different from a position of the first virtual axis.

10 Claims, 5 Drawing Sheets

HINGE DEVICE

FIELD OF THE INVENTION

The invention relates to a hinge device, particularly a hinge with uniform stress distribution and a simple structure.

BACKGROUND OF THE INVENTION

TWM508002U discloses a rotating shaft device between a tripod and a system end, including a box assembly mounted on an electronic device. A top of the box assembly is combined with a cover plate that convers a partial top surface area. A flip-up member for assembly on the tripod, with a flat portion that covers and all other top surface areas, and an operating gap is formed at a junction between the flat portion of the flip-up member and the cover plate. The flip-up member is provided with an eccentric positioning block movably positioned within an internal operating space of the box assembly. A guide member is located at one end face of the eccentric positioning block, with a guide pin that moves through an arc-shaped guide slot of the guide member. A positioning pin is positioned within a relative limiting slot hole of the box assembly, allowing the rotating shaft device to be opened or closed within a very small gap operating space.

When the eccentric positioning block rotates relative to the box assembly, it drives the guide pin to move within the arc-shaped guide slot. At the same time, the guide member cooperates with an elastic torsion component, providing a torque required for the rotation of the eccentric positioning block, thus allowing the eccentric positioning to be temporarily positioned at different angles.

However, the guide member is implemented on one side only, rather than symmetrically on both sides of the eccentric positioning block. This results in uneven torque on both sides of the eccentric positioning block, which affects the structural stability of the rotating shaft device. Furthermore, an overall structure of the rotating shaft device is complex. One end of the guide member must be fixed within the internal operating space of the box assembly using the positioning pin. The guide pin passed through the arc-shaped guide slot of the guide member, making the assembly of the rotating shaft device cumbersome and inconvenient.

SUMMARY OF THE INVENTION

A main object of the invention is to improve the problem of uneven torsion affecting the structural stability of conventional hinges.

The other object of the invention is to improve the problem of inconvenient assembly caused by the complex structure of conventional hinges.

In order to achieve the above object, the invention provides a hinge device, including a base, an arc-shaped mounting member, and two torque components. The base is formed with a mounting space and two first tracks located on two opposite sides of the mounting space. The arc-shaped mounting member is provided with an arc-shaped portion positioned in the mounting space and moves along the two first tracks, and a mounting portion connects to the arc-shaped portion. The arc-shaped portion defines a first virtual axis, while the two opposing sides of the mounting portion are formed with two second tracks. Each of the two torque components includes a shaft located on one side of the base, a torque providing component mounted on the shaft, and a linkage rod. The linkage rod is provided with a second virtual axis different from a position of the first virtual axis. One end of the linkage rod is connected to the shaft and in contact with the torque providing component, the other end of the linkage rod is connected to one of the two second tracks.

In one embodiment, at least one of the linkage rod or the torque providing component is formed with at least one protruding portion.

In one embodiment, at least one of the linkage rod or the torque providing component is formed with at least one recessed portion.

In one embodiment, the base is provided with a plurality of stopping blocks positioned within the two first tracks to determine a movement range of the arc-shaped mounting member.

In one embodiment, the arc-shaped mounting member includes two auxiliary tracks facing the base and being concentrically arranged with the two first tracks; the base includes a plurality of auxiliary protrusions located within the two auxiliary tracks and along the two first tracks.

In one embodiment, the base includes two halves with structurally corresponding, and the mounting space is formed by the two halves.

In one embodiment, the base includes an assembly plate connecting to the two halves.

In one embodiment, the assembly plate is provided with a baffle extending toward the arc-shaped mounting member and limiting a movement range of the arc-shaped mounting member.

In one embodiment, the assembly plate is formed with at least one positioning notch, and at least one of the two halves includes at least one assembly protrusion located within the at least one positioning notch.

Through the aforementioned embodiments, the invention provides the following advantages compared to conventional technologies:

The two torque components apply torque to the arc-shaped mounting member through the cooperation between the linkage rod and the torque providing component. These two torque components are symmetrically positioned on two opposite sides of the arc-shaped mounting member, ensuring that the torque applied to the arc-shaped mounting member on both sides is equal. This configuration enhances the structural stability of the hinge device during rotation. The base, the arc-shaped mounting member, and the two torque components have a simple structure, making an overall hinge device easier to assemble compared to conventional technologies. The first virtual axis of the arc-shaped portion and the second virtual axis of the linkage rod are positioned differently. With the arrangement of the two second tracks, the arc-shaped mounting member can drive the linkage rod together during its movement, ensuring smoother and more coordinated operation.

DETAILED DESCRIPTION OF THE PREFERRED EMBODIMENTS

Figure 1:
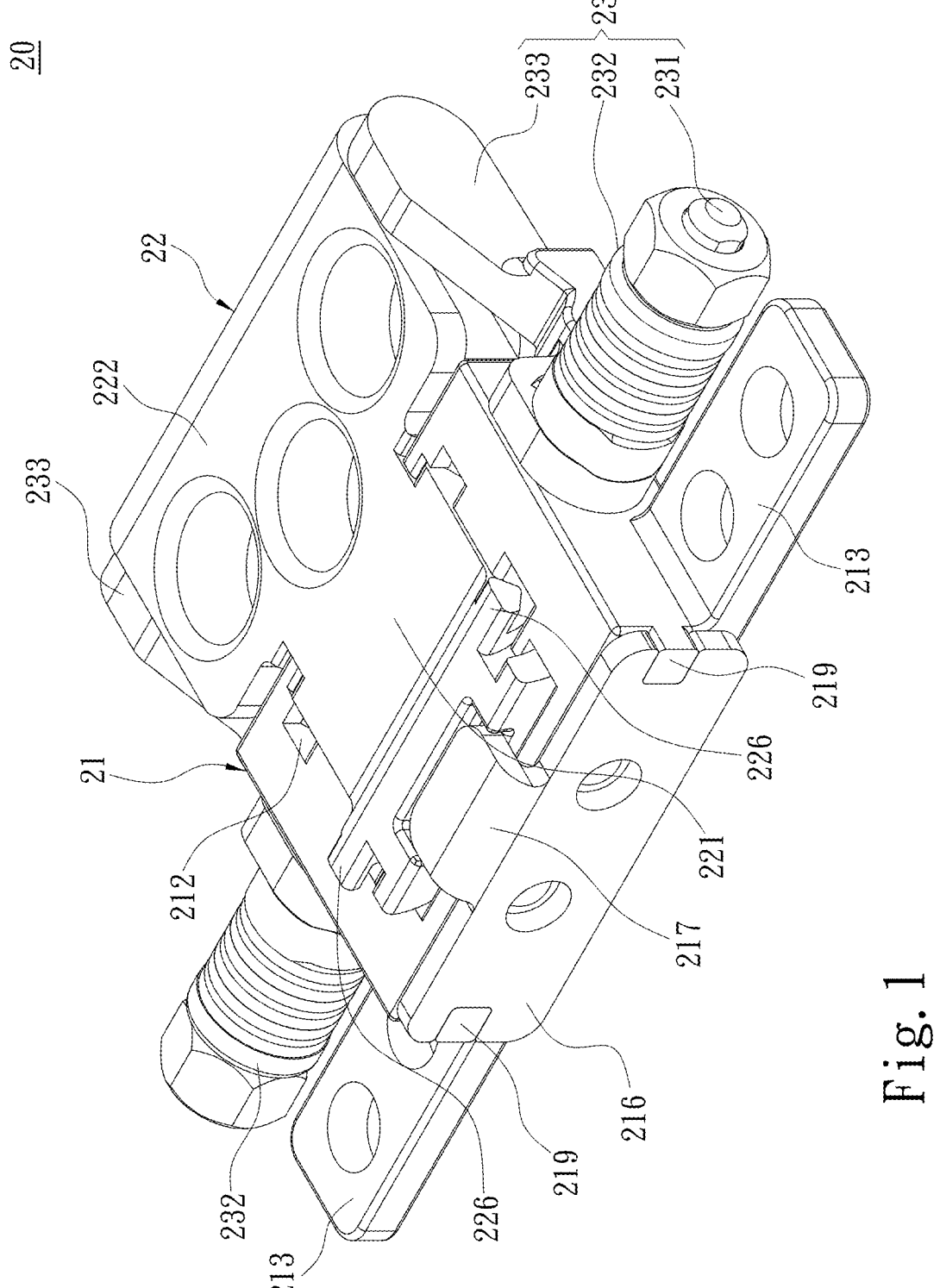
FIG. 1 is a schematic structural diagram of a hinge device according to the present disclosure.

Please refer to FIG. 1, FIG. 2, FIG. 3, FIG. 4 and FIG. 5. The invention provides a hinge device 20 including a base 21 and an arc-shaped mounting member 22. The base 21 is formed with a mounting space 211 and two first tracks 212 located on two opposite sides of the mounting space 211. The arc-shaped mounting member 22 is provided with an arc-shaped portion 221 positioned in the mounting space 211 and moves along the two first tracks 212, and a mounting portion 222 connects to the arc-shaped portion 221, and two opposing sides of the mounting portion 222 are formed with two second tracks 223. The mounting portion 222 of the arc-shaped mounting member 22 is located on an outside of the base 21. The mounting portion 222 can be used to install the hinge device 20 onto in an object to be supported (not shown in the figure) via a bracket, allowing the hinge device 20, when extended, to maintain the object to be supported at a specific angle. The supported object may be a tablet or a display, and the hinge device 20 allows the object to be supported to be positioned at an angle on a desktop, a ground, or any flat surface, presenting a viewable angle for a user. In this embodiment, the base 21 includes two mounting plates 213 for assembling the object to be supported. The arc-shaped portion 221 can be formed from a semicircular body or an arc-shaped plate, with one side of the arc-shaped portion 221 being mainly arc-shaped, not limited by the illustrations in FIG. 2 and FIG. 3.

Please refer to FIG. 1, FIG. 2, FIG. 3, FIG. 4 and FIG. 5. The hinge device 20 further includes two torque components 23. Each of the two torque components 23 includes a shaft 231 located on one side of the base 21, a torque providing component 232 mounted on the shaft 231, and a linkage rod 233. One end of the linkage rod 233 is connected to the shaft 231 and in contact with the torque providing component 232, the other end of the linkage rod 233 connects to one of the two second tracks 223. The two torque components 23 are symmetrically arranged on opposite sides of the arc-shaped mounting member 22. When the arc-shaped mounting member 22 rotates relative to the base 21, the two torque components 23 apply torque to the arc-shaped mounting member 22, ensuring that the torque applied on the two opposite sides of the arc-shaped mounting member 22 is equal. This configuration avoids applying the torque to only one side of the arc-shaped mounting member 22 through a single torque component 23, thereby enhancing the structural stability of the hinge device 20 during operation. Further, the hinge device 20 has a simple structure, so that during assembly, two linkage rods 233 are respectively positioned on the outer sides of the base 21 opposite to each other, with two ends of the two linkage rods 233 contacting the torque providing component 232 and connecting to the arc-shaped mounting member 22, making an assembly process easier. The arc-shaped portion 221 defines a first virtual axis 228, and the linkage rod 233 includes a second virtual axis 239 that is in a position different from that of the first virtual axis 228. Through the design of the two second tracks 223, when the mounting portion 222 is driven through the arc-shaped portion 221, the linkage rod 233 can be simultaneously driven.

On the other hand, the two second tracks 223 are not located on either the base 21 or the linkage rod 233, so that lengths of the base 21 and the linkage rod 233 do not need to be increased in accordance with the length of the two second track 223. This design reduces an overall volume occupied by the hinge device 20 when installed on the object to be supported.

Figure 2:
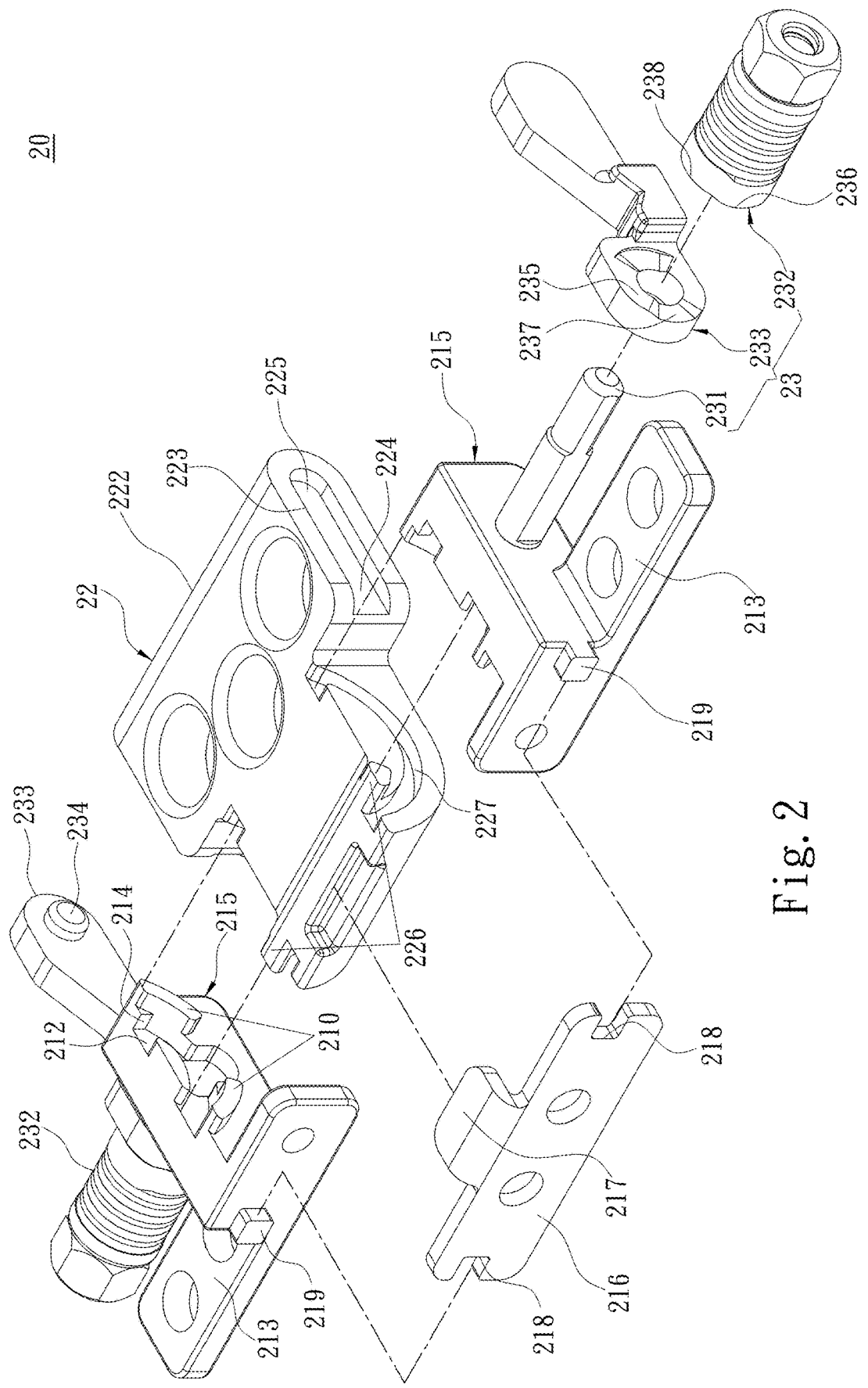
FIG. 2 is a structural exploded diagram (I) of the hinge device according to the present disclosure.
Figure 3:
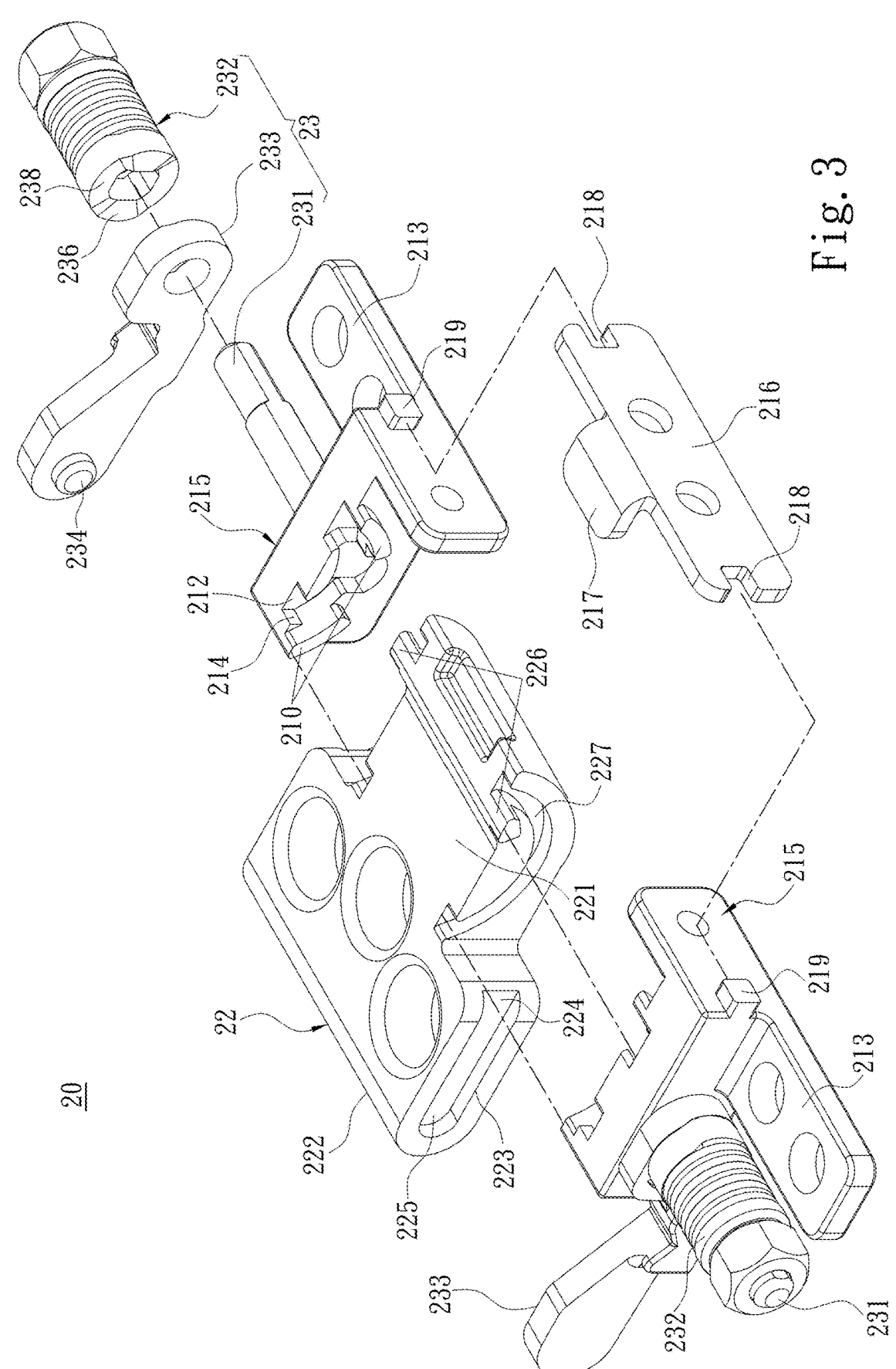
FIG. 3 is a structural exploded diagram (II) of the hinge device according to the present disclosure.
Figure 4:
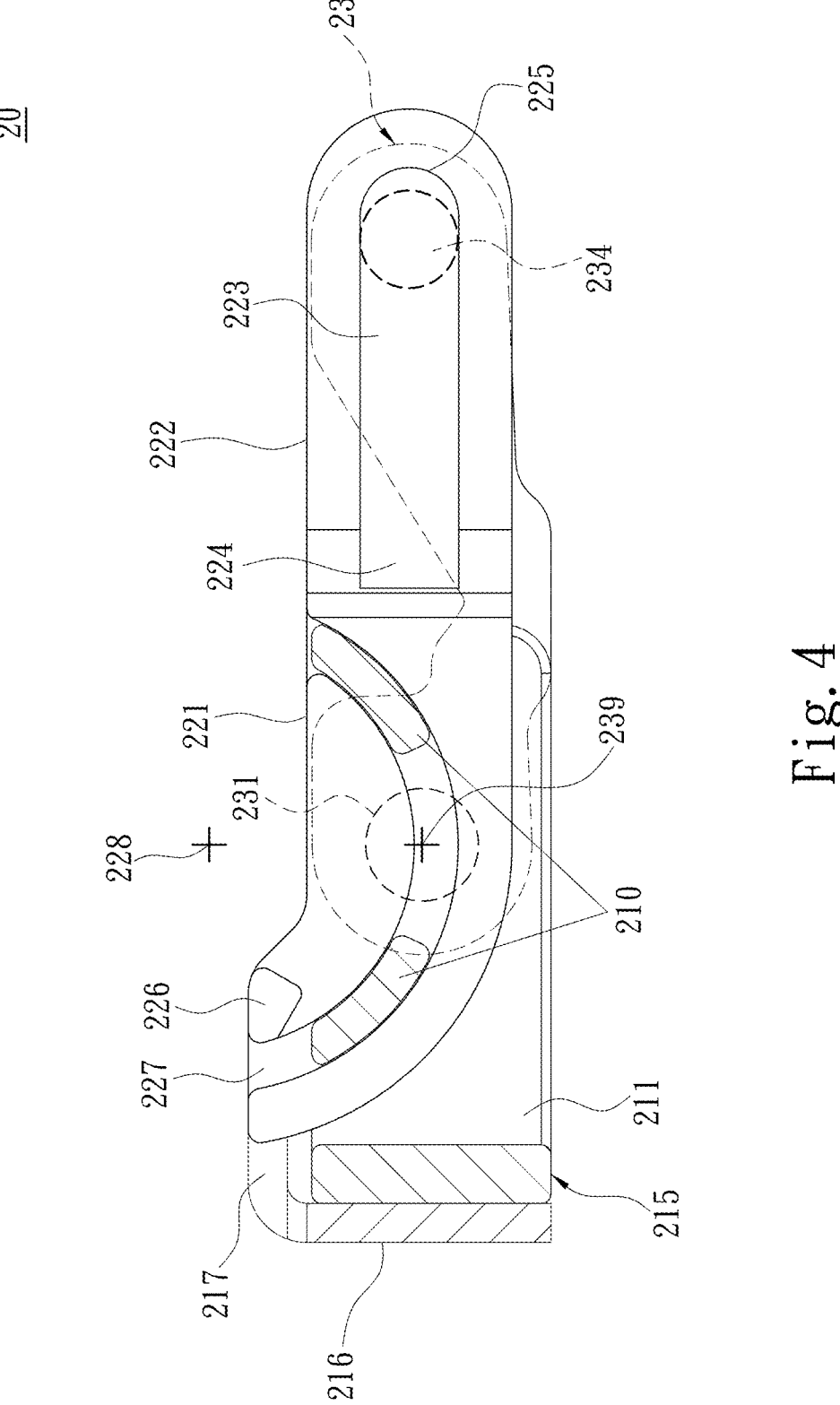
FIG. 4 is a schematic diagram (I) showing actuation of the hinge device according to the present disclosure.
Figure 5:
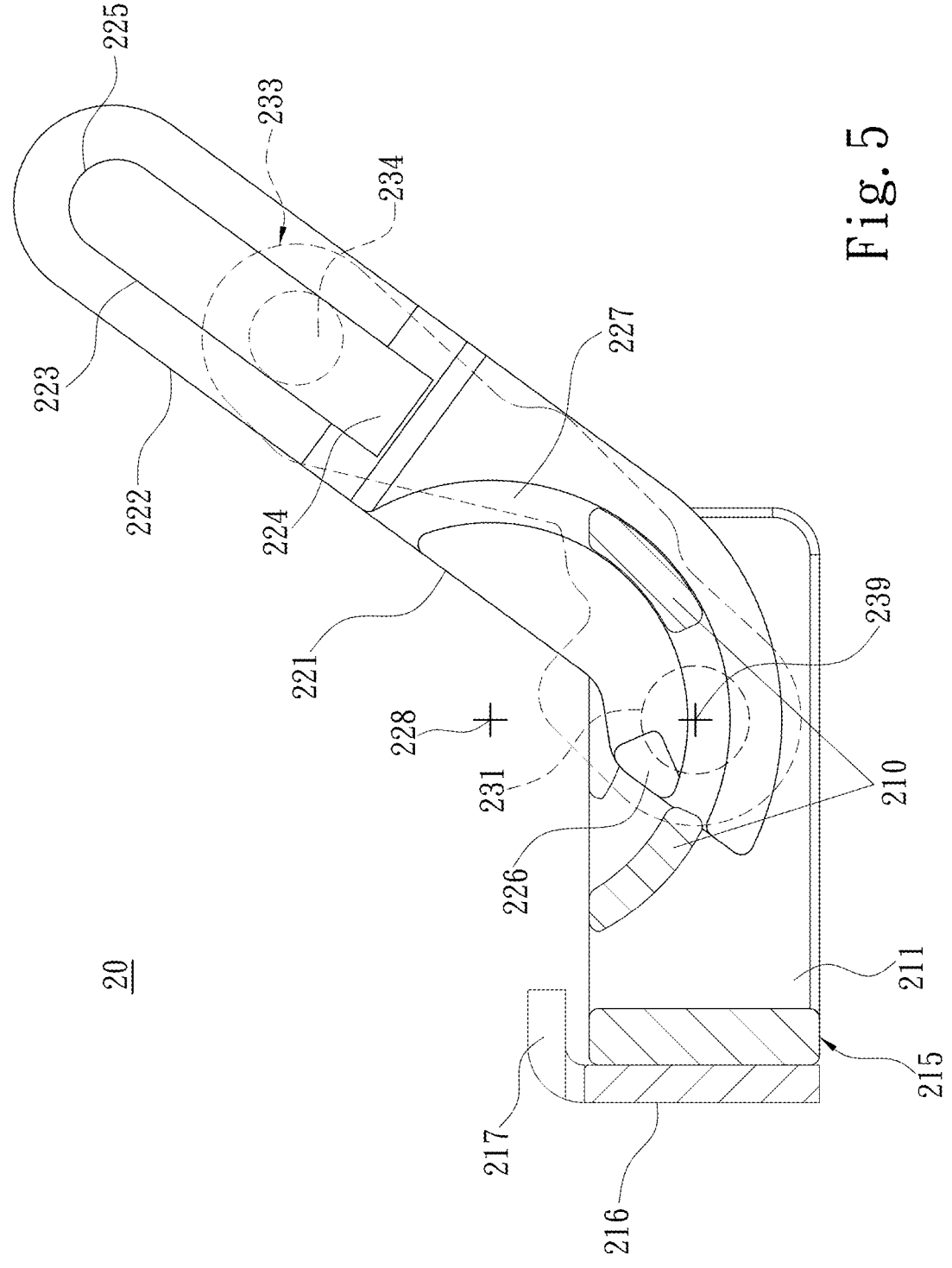
FIG. 5 is a schematic diagram (II) showing actuation of the hinge device according to the present disclosure.

Please refer to FIG. 2, FIG. 3, FIG. 4 and FIG. 5. For the convenience of further explanation, the two second tracks 223 are each defined with two ends, a head end 224 adjacent to the base 21 and a tail end 225 distant from the base 21, based on relative positions thereof. When the arc-shaped portion 221 of the arc-shaped mounting member 22 is accommodated within the base 21, it is in a closed state (as shown in FIG. 4). When the arc-shaped mounting member 22 rotates in a direction opposite to the base 21, it is in an open state (as shown in FIG. 5). Additionally, a connection protrusion 234 is provided between one of the two linkage rod 233 and one of the two second tracks 223 to connect thereof. First, assuming that the arc-shaped mounting member 22 is in the closed state, two connection protrusions 234 of the two linkage rods 233 are located at two tail ends 225 of the two second tracks 223, respectively. When the hinge device 20 is to be opened, the mounting portion 222 of the arc-shaped mounting member 22 is displaced relative to the base 21 under force, driving the arc-shaped portion 221 to rotate along the two first tracks 212. At the same time, this movement drives the two connection protrusions 234 of the two linkage rods 233 to move, causing the two connection protrusions 234 to move from the two tail ends 225 toward two head ends 224 of the two second tracks 223. For further explanation, by movement of the two connection protrusions 234 of the two linkage rods 233, the arc-shaped mounting member 22 drives the two linkage rods 233 in a situation that the second virtual axis 239 and the first virtual axis 228 have different positions. Moreover, during the movement of the two connection protrusions 234, the arc-shaped mounting member 22 is continuously subjected to the torque generated by the two linkage rods 233 and two torque providing components 232 via the two connecting protrusions 234. When the arc-shaped mounting member 22 stops being subjected to force, the arc-shaped mounting member 22 is positioned at a specific angle by the torque existed, and the angle of the arc-shaped mounting member 22 changes when the arc-shaped mounting member 22 is subjected to a torque greater than or equal to the torque existed again. The arc-shaped mounting member 22 continues to rotate until the two connection protrusions 234 are located at the two head ends 224, which is a maximum rotation angle of the arc-shaped mounting member 22. Furthermore, if the hinge device 20 is to be returned to the closed state, the mounting portion 222 of the arc-shaped mounting member 22 rotates in a reverse direction, driving one end of each of the two linkage rods 233 to move in an opposite direction, so that the two connection protrusions 234 move from the two head ends 224 toward the two tail ends 225, and the hinge device 20 is returned to the closed state when the two connection protrusions 234 are located at the two tail ends 225.

Two torque components 23 are symmetrically arranged on opposite sides of the arc-shaped mounting member 22, so that the torque received by the arc-shaped mounting member 22 during rotation is even and consistent compared with conventional hinges, thereby improving overall structural stability of the hinges. Furthermore, the two linkage rods 233 are disposed on the outer sides of the base 21 opposite to each other, instead of being disposed in the mounting space 211 like conventional hinges, so as to improve a problem of inconvenient assembly of conventional hinges. When the arc-shaped portion 221 rotates, by the movement of the two connection protrusions 234 of the two linkage rods 233, the second virtual axis 239 and the first virtual axis 228 have different positions., and a linkage relationship is formed between the mounting portion 222 and each of the two linkage rods 233.

Please refer to FIG. 2 and FIG. 3. Either the two linkage rods 233 or the two torque providing components 232 are formed with at least one protruding portion 235, 236. For example, in one embodiment, each of the two linkage rods 233 includes the at least one protruding portion 235, and surfaces of the two torque providing components 232 contacting the two linkage rods 233 are flat. In another embodiment, each of the two torque providing components 232 includes the at least one protruding portion 236, and surfaces of the two linkage rods 233 contacting the two torque providing components 232 are flat. In yet another embodiment, both the two linkage rods 233 and the two torque providing components 232 each include the protruding portions 235, 236. When the two linkage rods 233 rotates, the torque required by the arc-shaped mounting member 22 is generated by friction between the at least one protruding portion 235, 236 and flat surfaces.

On the other hand, in the embodiment in which the two linkage rods 233 and the two torque providing components 232 respectively include the at least one protruding portion 235, 236, the two linkage rods 233 and the two torque providing components 232 are respectively formed with at least one recessed portion 237, 238. Specifically, each of the two linkage rods 233 includes the at least one protruding portion 235 and the at least one recessed portion 237, while each of the two torque providing components 232 includes the at least one protruding portion 236 and the at least one recessed portion 238. Through a concave-convex design of each of the two linkage rods 233 and each of two torque providing components 232 in contact with each other, the arc-shaped mounting member 22 generates torque variations when it is rotated to different angles, so as to facilitate the user's operation of the hinge device 20.

Please refer to FIG. 2, FIG. 3, FIG. 4, and FIG. 5. In one embodiment, the arc-shaped portion 221 includes two protrusions 226 located on the two first tracks 212, and the base 21 includes a plurality of stopping blocks 214 located within the two first tracks 212 to determine a movement range of the arc-shaped mounting member 22. In detail, the plurality of stopping blocks 214 contact one of the two protrusions 226 to restrict a movement range of one of the two protrusions 226 when one of the two protrusions 226 moves along one of the two first tracks 212, thereby restricting a rotational angle of the arc-shaped portion 221.

Please refer to FIG. 2, FIG. 3, and FIG. 4. In one embodiment, the base 21 includes two halves 215 with structurally corresponding, and the mounting space 211 is formed by the two halves 215. The two first tracks 212 are respectively located in the two halves 215. The arc-shaped mounting member 22 is firstly assembled with one of the two halves 215, and assemble with the other one of the two halves 215 to facilitate assembling the base 21 with the arc-shaped mounting member 22 before the mounting space 211 is formed.

Please refer to FIG. 2, FIG. 3, FIG. 4, and FIG. 5. In one embodiment, the base 21 includes an assembly plate 216 connected to the two halves 215. The assembly plate 216 shown in the figure is for illustration purposes only and is not intended to limit a position of the assembly plate 216. In another embodiment, the assembly plate 216 is provided with a baffle 217 extending toward the arc-shaped mounting member 22 and limiting the movement range of the arc-shaped mounting member 22. The baffle 217 is located on a rotation trajectory of the arc-shaped mounting member 22. When the arc-shaped portion 221 of the arc-shaped mounting member 22 rotates toward the baffle 217 along the two first tracks 212, the baffle 217 blocks and prevents the arc-shaped portion 221 from rotating excessively. In yet another embodiment, the assembly plate 216 is formed with at least one positioning notch 218, and at least one of the two halves 215 includes at least one assembly protrusion 219 located within the at least one positioning notch 218. The at least one assembly protrusion 219 is provided for assisting in positioning the assembly plate 216 at an installation position on the two halves 215.

Please refer to FIG. 3, FIG. 4, and FIG. 5. In one embodiment, the arc-shaped mounting member 22 includes two auxiliary tracks 227 facing the base 21 and concentrically arranged with the two first tracks 212. The base 21 includes a plurality of auxiliary protrusions 210 located within the two auxiliary tracks 227 and along the two first tracks 212. For further illustration, the plurality of auxiliary protrusions 210 may be respectively arranged on the two auxiliary tracks 227. Furthermore, the plurality of auxiliary protrusions 210 are spaced apart from each other on each of the two auxiliary tracks 227 to assist in rotation of the two first tracks 212. Additionally, a number 5 of the plurality of auxiliary protrusions 210 on each of the two auxiliary tracks 227 is at least one.

What is claimed is:

1. A hinge device, comprising:
   a base, formed with a mounting space and two first tracks located respectively on two opposite sides of the mounting space;
   an arc-shaped mounting member, comprising an arc-shaped portion positioned in the mounting space and moved along the two first tracks, and a mounting portion connected to the arc-shaped portion, wherein a first virtual axis is defined by the arc-shaped portion, and two second tracks are respectively formed on two opposite sides of the mounting portion; and
   two torque components, each comprising a shaft located on one side of the base, a torque providing component mounted on the shaft, and a linkage rod, wherein the linkage rod is provided with a second virtual axis different from a position of the first virtual axis, and one end of the linkage rod is rotatably connected to the shaft and in contact with the torque providing component, another end of the linkage rod is slidably connected to one of the two second tracks.

2. The hinge device as claimed in claim 1, wherein at least one of the linkage rod and the torque providing component is formed with at least one protruding portion.

3. The hinge device as claimed in claim 2, wherein at least one of the linkage rod and the torque providing component is formed with at least one recessed portion.

4. The hinge device as claimed in claim 3, wherein the base is provided with a plurality of stopping blocks positioned within the two first tracks, respectively, to determine a movement range of the arc-shaped mounting member.

5. The hinge device as claimed in claim 4, wherein the arc-shaped mounting member includes two auxiliary tracks formed respectively on opposite sides thereof facing the base and concentrically arranged with the two first tracks, and the base includes a plurality of auxiliary protrusions located respectively within the two auxiliary tracks and along the two first tracks.

6. The hinge device as claimed in claim 5, wherein the base includes two halves with structurally corresponding, and the mounting space is formed by the two halves.

7. The hinge device as claimed in claim 6, wherein the base includes an assembly plate connecting to the two halves.

8. The hinge device as claimed in claim 7, wherein the assembly plate is provided with a baffle extending toward the arc-shaped mounting member and limiting a movement range of the arc-shaped mounting member.

9. The hinge device as claimed in claim 7, wherein the assembly plate is formed with at least one positioning notch, and at least one of the two halves includes at least one assembly protrusion located within the at least one positioning notch.

10. The hinge device as claimed in claim 8, wherein the assembly plate is formed with at least one positioning notch, and at least one of the two halves includes at least one assembly protrusion located within the at least one positioning notch.

\* \* \* \* \*